United States Patent
Shin et al.

(10) Patent No.: US 7,603,865 B2
(45) Date of Patent: Oct. 20, 2009

(54) MAGNETIC REFRIGERATOR

(75) Inventors: Seung Hoon Shin, Seoul (KR); Dong Kwan Lee, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 0 days.

(21) Appl. No.: 12/118,377

(22) Filed: May 9, 2008

(65) Prior Publication Data

US 2008/0216485 A1 Sep. 11, 2008

Related U.S. Application Data

(63) Continuation of application No. PCT/KR2006/004653, filed on Nov. 9, 2006.

(30) Foreign Application Priority Data

| Nov. 10, 2005 | (KR) | ...... 10-2005-0107305 |
| Nov. 10, 2005 | (KR) | ...... 10-2005-0107306 |
| Nov. 10, 2005 | (KR) | ...... 10-2005-0107308 |
| Dec. 21, 2005 | (KR) | ...... 10-2005-0126983 |

(51) Int. Cl.
*F25B 21/00* (2006.01)

(52) U.S. Cl. .................................. 62/3.1

(58) Field of Classification Search ............ 62/3.1
See application file for complete search history.

(56) References Cited

U.S. PATENT DOCUMENTS

| 3,108,444 | A | * | 10/1963 | Kahn | ............ 62/3.1 |
| 4,107,935 | A | * | 8/1978 | Steyert, Jr. | ............ 62/3.1 |
| 4,408,463 | A | * | 10/1983 | Barclay | ............ 62/3.1 |
| 4,441,325 | A | | 4/1984 | Bon-Mardion et al. | |
| 4,507,927 | A | * | 4/1985 | Barclay | ............ 62/467 |
| 4,599,866 | A | * | 7/1986 | Nakagome et al. | ............ 62/3.1 |
| 4,727,721 | A | * | 3/1988 | Peschka et al. | ............ 62/3.1 |
| 4,727,722 | A | * | 3/1988 | Kirol | ............ 62/3.1 |
| 4,785,636 | A | * | 11/1988 | Hakuraku et al. | ............ 62/3.3 |
| 6,526,759 | B2 | | 3/2003 | Zimm et al. | |
| 6,595,004 | B1 | * | 7/2003 | Ghoshal | ............ 62/3.1 |
| 6,668,560 | B2 | | 12/2003 | Zimm et al. | |

FOREIGN PATENT DOCUMENTS

JP 03070944 3/1991

* cited by examiner

*Primary Examiner*—William C Doerrler
(74) *Attorney, Agent, or Firm*—Edell, Shapiro & Finnan, LLC (57) ABSTRACT

A magnetic refrigerator includes independent hot heat exchange unit and cold heat exchange unit wherein separate heat transfer fluids are circulated.

17 Claims, 8 Drawing Sheets

MAGNETIC REFRIGERATOR

CROSS REFERENCE TO RELATED APPLICATIONS

This application is a continuation of International Application No. PCT/KR2006/004653, filed on Nov. 9, 2006, entitled "Magnetic Refrigerator," which claims priority under 35 U.S.C. §119 to Application Nos. KR 10-2005-0107305 filed on Nov. 10, 2005; KR 10-2005-0107306 filed on Nov. 10, 2005; KR 10-2005-0107308 filed on Nov. 10, 2005; and KR 10-2005-0126983 filed on Dec. 21, 2005, the entire contents of which are hereby incorporated by reference.

FIELD OF THE INVENTION

The present invention relates to a magnetic refrigerator having independent hot heat exchange unit and cold heat exchange unit wherein separate heat transfer fluids are circulated.

BACKGROUND

Figure 1:
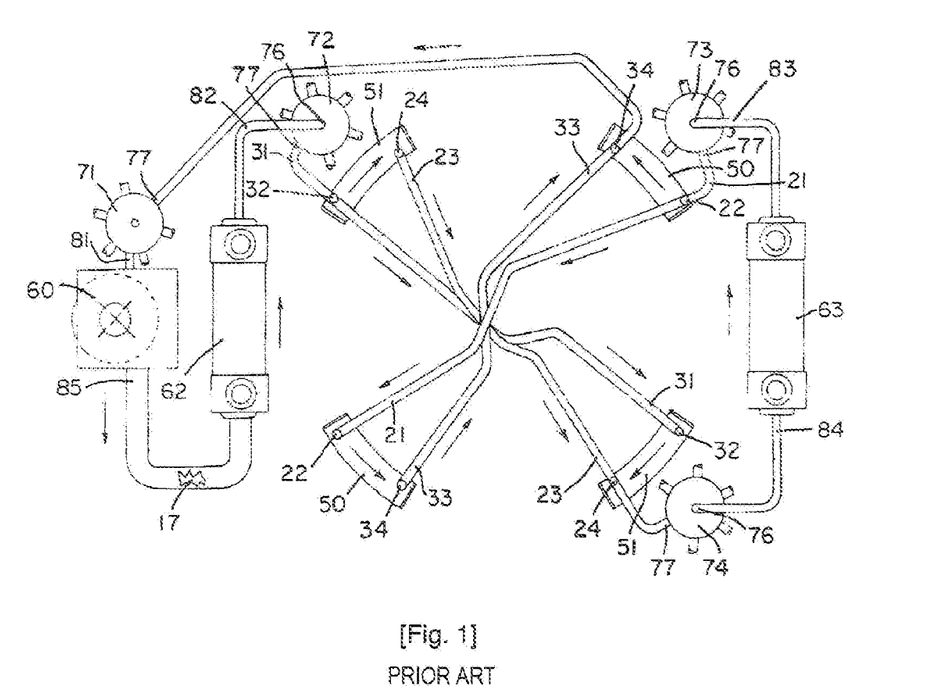
FIG. 1 is a plan view illustrating a heat transfer fluid in a conventional rotational magnet magnetic refrigerator.
Figure 2:
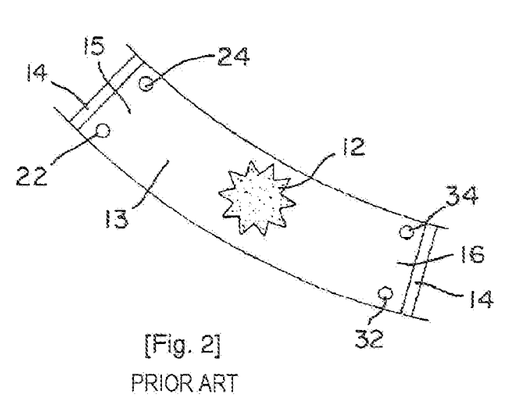
FIG. 2 is a plan view exemplifying a magnetic heat exchange unit including a magnetocaloric material of FIG. 1.

A conventional magnetic refrigerator is disclosed in U.S. Pat. No. 6,668,560. As shown in FIGS. 1 and 2, in accordance with the conventional magnetic refrigerator, while a heat transfer fluid 17 entering into a cold side inlet port 22 through a cold side inlet pipe 21 flows to a hot side outlet port 34, the heat transfer fluid 17 absorbs a heat generated by a magnetocaloric effect of a magnetocaloric material 12 having a magnetic field applied thereto and exits to a hot side outlet pipe 33 through a hot side outlet ports 34 to cool the magnetocaloric material 12. A hot side sequentially passes the hot side outlet pipe 33, a valve 71, a pump 60, and a hot heat exchanger 62 and flows into a magnetic heat exchange compartment 13. In a hot side inlet pipe 31, the hot side is divided into the hot side inlet pipe 31 and a cold side outlet port 23, and meets a cold side at a cold side outlet pipe 24 and proceed to a valve 74. When the hot side moves from a hot side inlet port 32 to the cold side outlet pipe 24, the hot side is cooled by passing the magnetocaloric material 12 already cooled by the hot side. The cold side that has passed through the valve 74 passes a cold heat exchanger 63 and flows to pipes 83 and 21 to repeat a cycle (a detailed description is omitted. See U.S. Pat. No. 6,668,560 for omitted reference numerals).

As described above, since the conventional magnetic refrigerator comprises twelve magnetic heat exchange compartments, four valves 71, 72, 73 and 74 and more than 24 pipes, it is difficult to manufacture the conventional magnetic refrigerator.

Moreover, since a single heat transfer fluid is circulated to serve as the hot side and the cold side simultaneously, that is, since the hot side enters at the hot side inlet port 32 to pass the cold magnetocaloric material (See FIG. 2) and cooled into the cold side to exit through the cold side outlet pipe 24, a efficiency of a heat exchange is degraded. It is known from this fact that when the heat transfer fluid having a temperature lower than that of the hot side entering the hot side inlet port 32 enters the hot side inlet port 32 and passes the cooled caloric material, the heat transfer fluid having a temperature lower at the cold side outlet pipe 24 may be flown out to improve the efficiency of the heat exchange.

In addition, since amount of the heat transfer fluid passing through the hot side cannot be controlled, a heat of the magnetocaloric material cannot be cooled promptly, thereby degrading the efficiency of the heat exchange.

On the other hand, when the magnetocaloric material passes through the magnetic heat exchange compartment, the magnetocaloric material is in direct contact with the heat transfer fluid, thereby causing an oxidation.

Moreover, the magnetocaloric material of a power type is lost through an exit (a mesh) when passing through the magnetic heat exchange compartment and the magnetocaloric material may be accumulated at the exit according to a strength of the heat transfer fluid to block a flow thereof.

SUMMARY

It is an object of the present invention to provide a magnetic refrigerator wherein a hot side and a cold side are divided to simplify a structure, to achieve a high heat efficiency, and to be capable of controlling an amount of a heat transfer fluid.

In order to achieve the above-described object, there is provided a magnetic refrigerator, comprising: a plurality of magnetic heat exchange units including a magnetocaloric material for passing through a flow of a heat transfer fluid; a rotating plate having the plurality of magnetic heat exchange units disposed along a circumference thereof, the plurality of magnetic heat exchange units having a predetermined distance therebetween; a magnet disposed between an upper surface and a bottom surface of the rotating plate, the magnet applying a magnetic field to increase a temperature when the plurality of magnetic heat exchange units pass; a hot heat exchange member disposed at a hot side of the plurality of magnetic heat exchange units; and a cold heat exchange member disposed at a cold side of the plurality of magnetic heat exchange units, wherein the heat transfer fluid is divided into a first heat transfer fluid circulating in the hot heat exchange member and a second heat transfer fluid circulating in the cold heat exchange member.

In accordance with the refrigerator, a hot side and a cold side are divided to simplify a structure, to achieve a high heat efficiency, and to be capable of controlling an amount of a heat transfer fluid.

It is preferable that the hot heat exchange member comprises a hot heat exchanger, a first pipe for moving the first heat transfer fluid at a cold side outlet of the hot heat exchanger to the hot side of the plurality of magnetocaloric exchange units, and a second pipe for moving the first heat transfer fluid to a hot side inlet of the hot heat exchanger, wherein the first heat transfer fluid absorbs a heat of the magnetocaloric material to be heated, and the cold heat exchange member comprises a cold heat exchanger, a third pipe for moving the second heat transfer fluid at a hot side outlet of the cold heat exchanger to the cold side of the plurality of magnetocaloric exchange units, and a fourth pipe for moving the second heat transfer fluid to a cold side inlet of the cold heat exchanger, wherein the second heat transfer fluid emits a heat to the magnetocaloric material to be cooled.

The refrigerator in accordance with claim 1, wherein the plurality of magnetocaloric exchange units comprises a mounting case mounted in a mounting hole disposed through the rotating plate, a mesh disposed at both ends of the mounting case, and the magnetocaloric material contained between the mesh and the mounting case.

In addition, it is preferable that the plurality of magnetocaloric exchange units comprises a mounting case mounted in a mounting hole disposed through the rotating plate, a mesh disposed at both ends of the mounting case, and the magnetocaloric material contained between the mesh and the mounting case.

Moreover, it is preferable that each of the plurality of magnetocaloric exchange units comprises a case including an upper case and lower case, and the magnetocaloric material sealed in the case, the magnetocaloric material changing a temperature thereof when the magnetic field is applied.

In addition, the case comprises a groove at a sidewall thereof to increase a contact length with the heat transfer fluid.

Moreover, the groove is slanted from an upper portion of the uppercase toward a lower portion of the lower case to increase a contact length with the heat transfer fluid. In addition, the case comprises an aluminum for superior heat transfer characteristic and processing characteristic.

Moreover, it is preferable that the upper case and the lower case are sealed by a copper brazing.

In addition, the case further comprises a through-hole for passing the heat transfer fluid therethrough to increase an amount of the heat transfer fluid passing therethrough.

When each of the plurality of magnetocaloric material pieces has a shape of plate arranged to have a gap therebetween or a shape of a rod having a constant circular cross-section in a lengthwise direction, a sufficient contact as well as smooth flow of the heat transfer fluid is provided.

It is preferable that the case is mounted in a manner that a portion of the case extends from a lower surface the rotating plate, and the magnet is disposed at both sides of the extending portion of the case.

It is preferable that an upper portion of the case has a shape of a funnel, and a supporting piece for supporting each of the plurality of magnetocaloric material pieces is disposed at a lower portion of the case.

It is preferable that the case comprises a groove at a sidewall thereof in a lengthwise direction to increase a contact area with the heat transfer fluid, thereby improving a heat exchange efficiency.

It is preferable that the magnetocaloric material comprises a gadolinium.

There is also provided a magnetic refrigerator comprising: a first rotating plate having a plurality of first magnetic heat exchange units disposed along a circumference thereof, the each of the plurality of first magnetic heat exchange units including a first magnetocaloric material for passing through a first heat transfer fluid; a first magnet disposed between an upper surface and a bottom surface of the first rotating plate, the first magnet applying a magnetic field to increase a temperature of the first magnetocaloric material when the plurality of first magnetic heat exchange units pass; a hot heat exchange member disposed at a hot side of the plurality of first magnetic heat exchange units; a second rotating plate having a plurality of second magnetic heat exchange units disposed along a circumference thereof, the each of the plurality of second magnetic heat exchange units including a second magnetocaloric material for passing through a second heat transfer fluid; a second magnet disposed between an upper surface and a bottom surface of the second rotating plate, the second magnet applying the magnetic field to increase a temperature of a second magnetocaloric material when the plurality of second magnetic heat exchange units pass; a cold heat exchange member disposed at a cold side of the plurality of first magnetic heat exchange units; and an intermediate circulation member for guiding an intermediate heat transfer fluid circulating between the cold side of the plurality of first magnetic heat exchange units and a hot side of the plurality of second magnetic heat exchange units.

In accordance with the refrigerator, a hot side and a cold side are divided for simplification of the structure, the high heat efficiency, and controlling an amount of a heat transfer fluid as well as increasing a temperature range of the heat transfer fluid.

DETAILED DESCRIPTION

The above-described objects and other objects and characteristics and advantages of the present invention will now be described in detail with reference to the accompanied drawings.

First Embodiment

Figure 3:
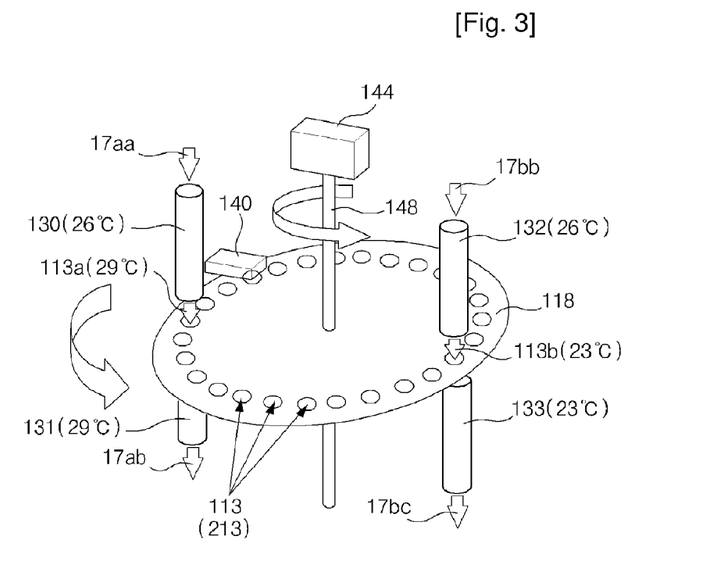
FIG. 3 is a perspective view illustrating elements of a magnetic refrigerator in accordance with a first preferred embodiment of the present invention.
Figure 4:
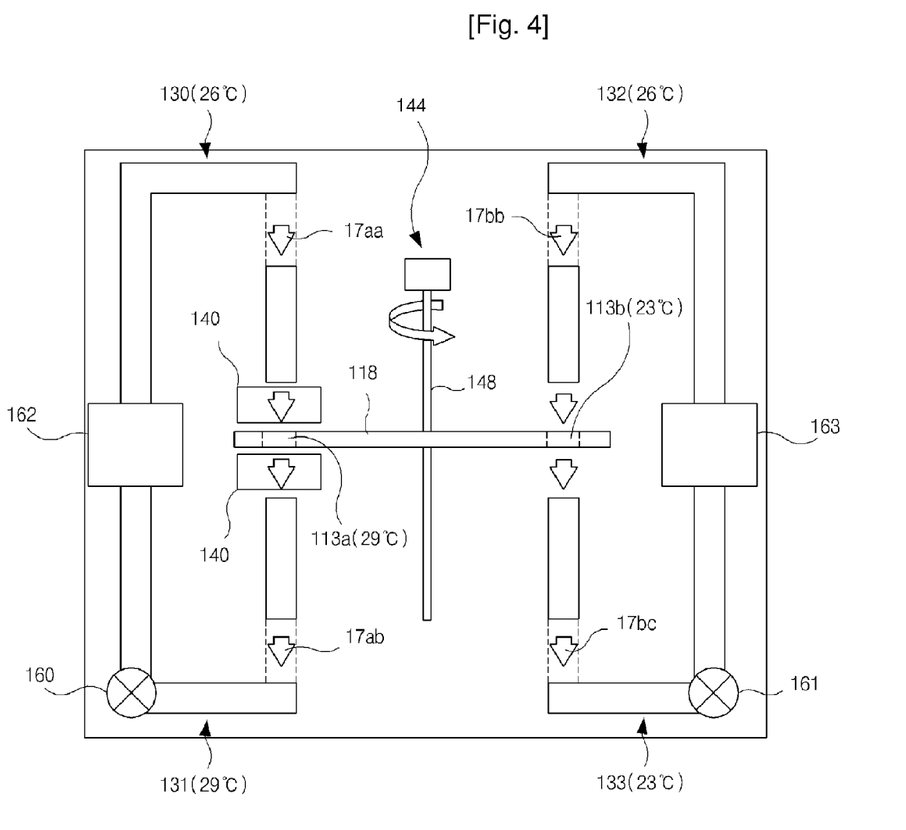
FIG. 4 is a front view of FIG. 3.

FIG. 3 is a perspective view illustrating elements of a magnetic refrigerator in accordance with a first preferred embodiment of the present invention, and FIG. 4 is a front view of FIG. 3.

As shown in FIGS. 3 and 4, the magnetic refrigerator in accordance with the first preferred embodiment of the present invention comprises a plurality of magnetic heat exchange units 113, a rotating plate 118 having the plurality of magnetic heat exchange units 113 disposed along a circumference thereof such that the plurality of magnetic heat exchange units 113 have a predetermined distance therebetween, a magnet 140 disposed on opposite sides of an upper surface and a lower surface of the rotating plate 118 wherein the magnet 140 applies a magnetic field to increase a temperature when the plurality of magnetic heat exchange units 113 pass, a hot heat exchange member disposed at a hot side 113a of the plurality of magnetic heat exchange units 113, and a cold heat exchange member disposed at a cold side 113b of the plurality of magnetic heat exchange units 113.

The heat transfer fluid is divided into a first heat transfer fluid 17a circulating in the hot heat exchange member and a second heat transfer fluid 17b circulating in the cold heat exchange member to form a cycle.

That is, the hot heat exchange member comprises a hot heat exchanger 162, a first pipe 130 for moving a first heat transfer fluid 17aa at a cold side outlet of the hot heat exchanger 162 to the hot side 113a of the plurality of magnetic heat exchange units 113, and a second pipe 131 for moving a first heat transfer fluid 17ab to a hot side inlet of the hot heat exchanger 162, wherein the first heat transfer fluid 17a absorbs a heat of a magnetocaloric material 112 to be heated.

Similarly, the cold heat exchange member comprises a cold heat exchanger 163, a third pipe 132 for moving a second heat transfer fluid 17bb at a hot side outlet of the cold heat exchanger 163 to the cold side 113b of the plurality of magnetic heat exchange units 113, and a fourth pipe 133 for moving a second heat transfer fluid 17bc to a cold side inlet of the cold heat exchanger 163, wherein the second heat transfer fluid 17bc emits a heat to the magnetocaloric material 112 to be cooled.

The plurality of magnetic heat exchange units 113 comprises the magnetocaloric material 112 which passes a flow of the heat transfer fluid. The magnetocaloric material 112 has a characteristic wherein the temperature thereof is changed when the magnetic field is applied. The magnetocaloric material 112 comprises a gadolinium (Gd) of a fine powder type. The gadolinium has pores having a high osmosis to the flow of the heat transfer fluid, and a superior absorption and emission of a heat.

The rotating plate 118 is rotated by a motor 144 rotating a shaft 148 fixed to a center of the rotating plate 118. The magnetocaloric materials 112 spaced apart by a predetermined distance are disposed in a circumferential direction.

Figure 5:
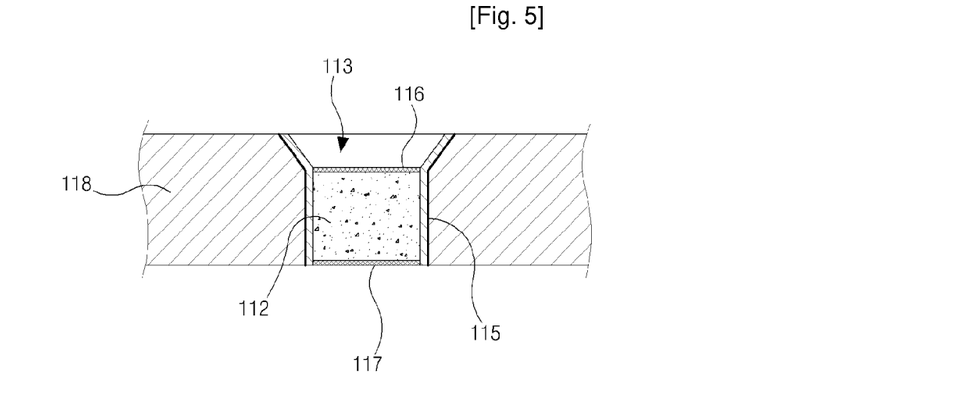
FIG. 5 is a cross-sectional view illustrating a magnetic heat exchange unit in accordance with a first alternate example of the first preferred embodiment of the present invention.

That is, the rotating plate 118 includes mounting holes punched along the circumference thereof, and the plurality of magnetic heat exchange units 113 shown in FIG. 5 are mounted in the mounting holes.

The plurality of magnetic heat exchange units 113 comprises a mounting case 115 mounted in the mounting holes, meshes 116 and 117 mounted at both ends of the mounting case 115, the magnetocaloric material 112 contained in the mounting case 115 between the meshes 116 and 117. Accordingly, this constitution facilitates mounting of the plurality of magnetic heat exchange units 113 on the rotating plate 118.

The magnet 140 is fixed over and under the rotating plate 118 immediately prior to the first pipe 130 and the second pipe 131 such that the meshes 116 and 117 magnetic field is applied to raise the meshes 116 and 117 temperature when the plurality of magnetic heat exchange units 113 passes.

Figure 6:
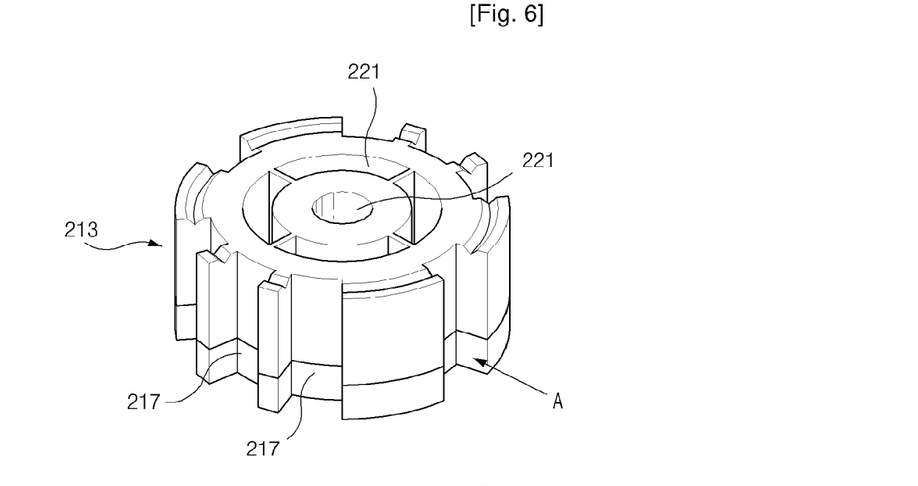
FIG. 6 is a perspective view illustrating a magnetic heat exchange unit in accordance with a second alternate example of the first preferred embodiment of the present invention.
Figure 7:
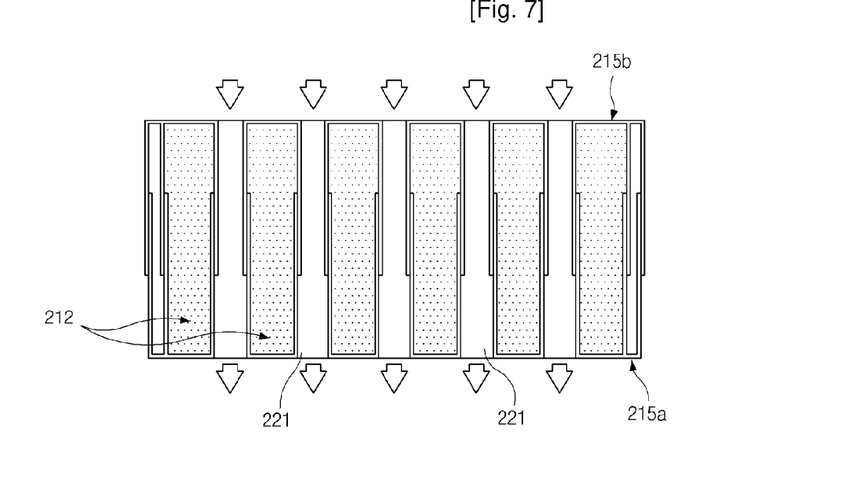
FIG. 7 is a lateral cross-sectional view of FIG. 6.
Figure 8:
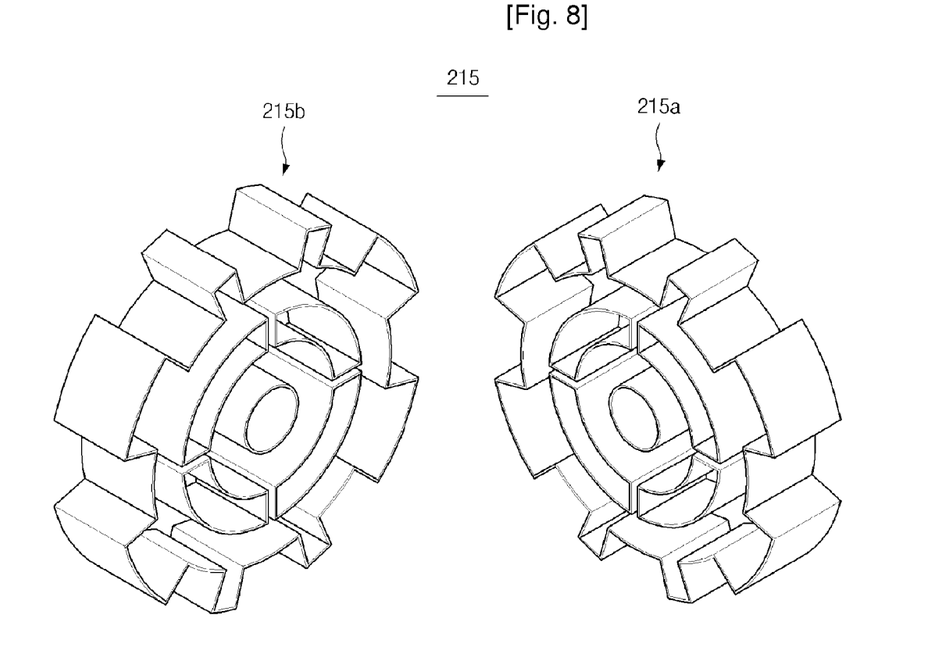
FIG. 8 is a perspective view illustrating a case of FIG. 6 disassembled.

On the other hand, as shown in FIGS. 6 through 8, it is preferable that a magnetic heat exchange unit 213 includes a case 215 mounted in the mounting hole of the rotating plate 118, and a magnetocaloric material 212 sealed in the case 215. The case 215 comprises a lower case 215a and an upper case 215b assembled together to carry out a heat exchange without a direct contact between the magnetocaloric material 212 and the heat transfer fluid. Therefore, the oxidation and the loss of the magnetocaloric material 212 are prevented.

It is preferable that the case 215 comprises an aluminum having superior heat transfer characteristic and processing characteristic.

In addition, it is preferable that the upper case 215b and the lower case 215a are sealed by a copper brazing in order to improve a sealing efficiency.

Moreover, the case 215 includes grooves 217 having a predetermined distance therebetween at a sidewall thereof to increase a contact area with the heat transfer fluid, thereby increasing the heat transfer efficiency.

It is preferable that each of the grooves 217 is slanted in order to increase a contact length with the heat transfer fluid.

Figure 9:
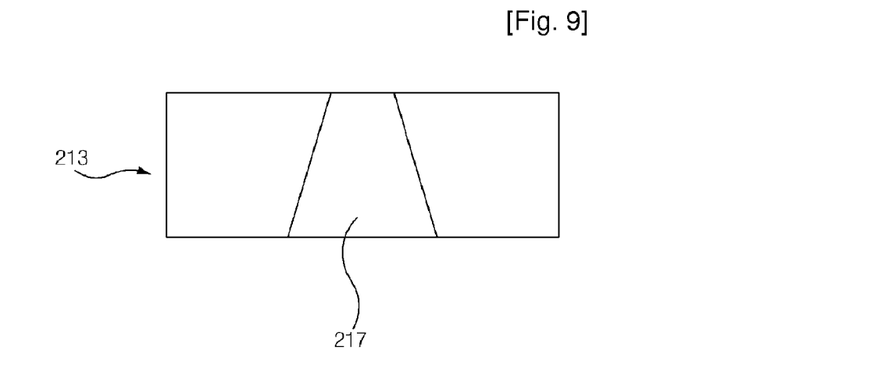
FIG. 9 is a lateral view of FIG. 6 taken from A direction for describing a groove schematically.
Figure 10:
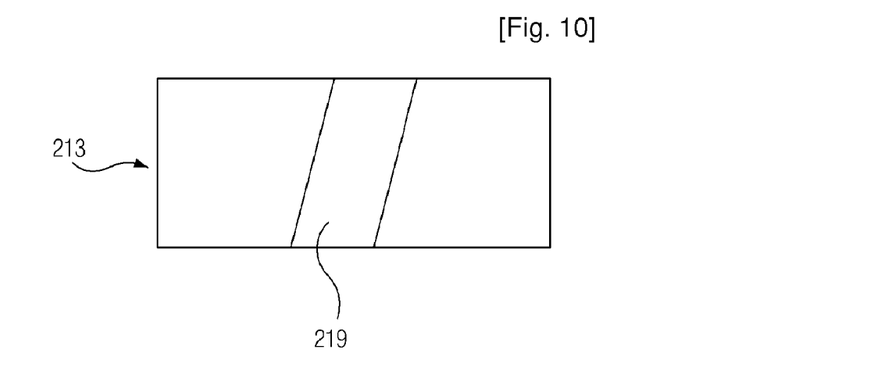
FIG. 10 is a lateral view of FIG. 6 taken from A direction for describing other groove schematically.

As shown in FIG. 9, each of the grooves 217 is slanted such that a width of each of the grooves 217 is increased from an upper portion to a lower portion, or as shown in FIG. 10, the grooves 219 itself is slanted to improve the heat exchange efficiency.

In addition, as shown in FIG. 6, the case 215 comprises a through-hole 221 for passing the heat transfer fluid therethrough to improve the heat exchange efficiency.

A cycle of the magnetic refrigerator in accordance with the present invention will now be described considering a characteristic of the magnetocaloric material wherein a temperature thereof rises by 3° C. when the magnetocaloric material is magnetized and drops by 3° C. when cooled by the heat transfer fluid to experiment the characteristic of the magnetocaloric material by setting an atmospheric temperature which carries out an heat exchange with the hot heat exchanger 162, and an atmospheric temperature which carries out an heat exchange with the cold heat exchanger 163 are set at 26° C. respectively.

As shown in FIGS. 3 and 4, the rotating plate 118 rotates by the motor 144 and the plurality of magnetic heat exchange units 113 sequentially pass the magnet 140, the hot heat exchanger 162 and the cold heat exchanger 163.

A magnetic heat exchange units 113 that passes the magnet 140 is heated to 29° C. by the magnetocaloric effect of the magnetocaloric material 112, and the plurality of magnetic heat exchange units 113 are cooled to 26° C. by the first heat transfer fluid 17aa of the first pipe 130 through which the magnetocaloric material 112 passes while the first heat transfer fluid 17ab are heated to 29° C. simultaneously. The heated first heat transfer fluid 17ab dissipates the heat by passing through the hot heat exchanger 162 via the second pipe 131, and the first heat transfer fluid 17aa cooled to 26° C. passes through the plurality of magnetic heat exchange units 113 via the first pipe 130. The above-described cycle is repeated.

The temperature of the magnetocaloric material which lost the heat to the heat transfer fluid drops to 23° C. while moving to the cold heat exchanger. The cold side 113b of 23° C. restores the temperature thereof to 26° C. by passing the second heat transfer fluid 17bb (26° C.) of the third pipe 132 while the temperature of the second heat transfer fluid drops to 23° C. The cooled second heat transfer fluid 17bc passes through the cold heat exchanger 163 via the fourth pipe 133 to emit a cold air (23° C.), the second heat transfer fluid 17bb heated to 26° C. passes through the plurality of magnetic heat exchange units 113 via the third pipe 132. The above-described cycle is repeated.

Pumps 160 and 161 is mounted at the second pipe 131 and the fourth pipe 133 respectively to propel the first heat transfer fluids 17aa and 17ab the second heat transfer fluids 17bb and 17bc.

As described above, the circulation of the heat transfer fluid is divided into the hot heat exchanger and the cold heat exchanger to have two cycles, and the magnetocaloric material 112 is mounted in the rotating plate 118 to be rotated between the hot heat exchanger and the cold heat exchanger for the heat exchange, thereby simplifying a structure of a magnetic refrigeration cycle.

In addition, in accordance with the system, since the heat transfer fluid at the atmospheric temperature is injected to the magnetocaloric material, the heat transfer fluid is heated and cooled more according to a state of the material to improve an efficiency of the heat exchanger.

Moreover, since the magnetic refrigerator is divided into the hot heat exchanger 162 and the cold heat exchanger 163, amounts of the first heat transfer fluid 17*aa* and the second heat transfer fluid 17*bb* are controlled to be different. Therefore, a larger amount of the first heat transfer fluid may be flown to the hot side of the magnetic heat exchange unit to maximize the cooling of the magnetocaloric material.

Second Embodiment

Figure 11:
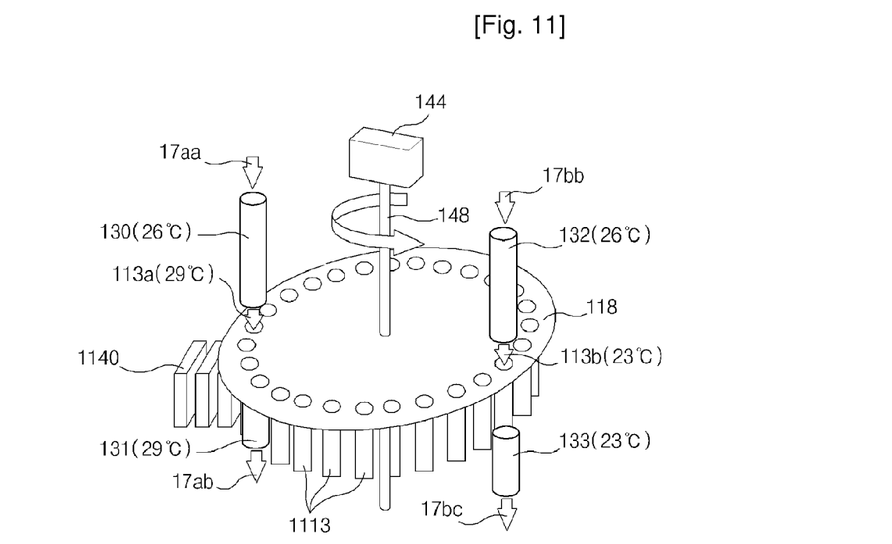
FIG. 11 is a perspective view illustrating elements of a magnetic refrigerator in accordance with a second preferred embodiment of the present invention.
Figure 12:
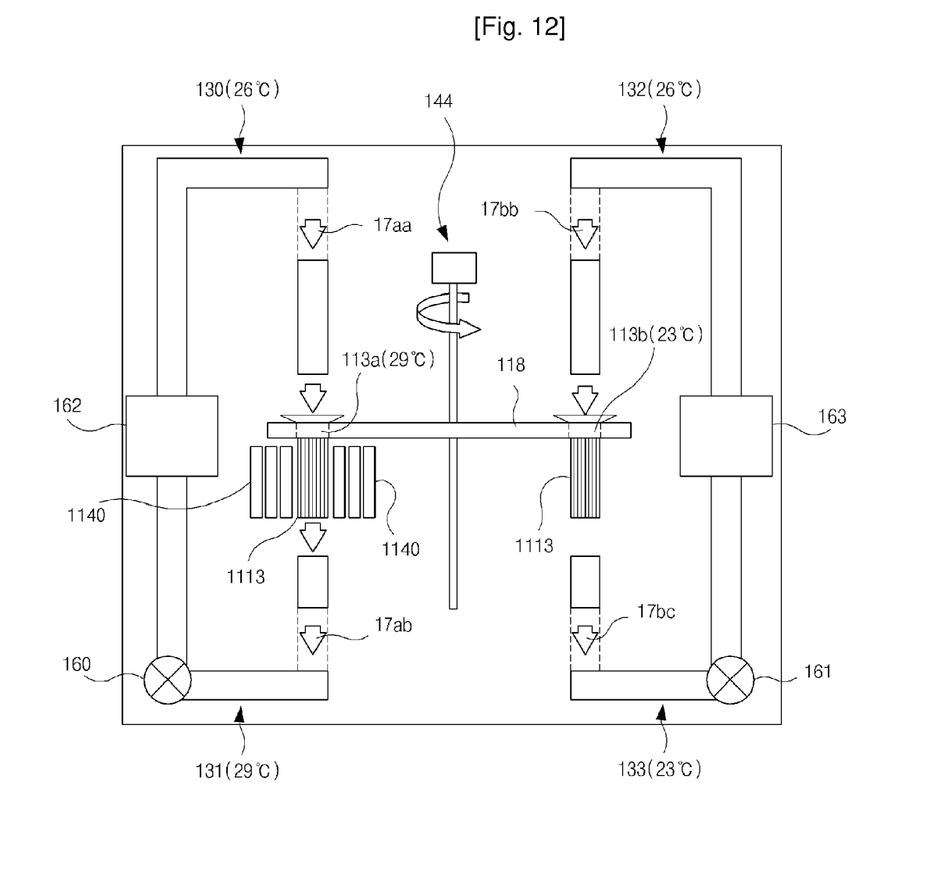
FIG. 12 is a front view of FIG. 11.

While a magnetic refrigerator in accordance with the second embodiment shown in FIGS. 11 and 12 is similar to that of the first embodiment, a magnet 1140 is disposed below the rotating plate 118 and on opposite sides of lower surfaces of a magnetic heat exchange units 1113 due to a difference in a mounting structure of the magnetic heat exchange unit.

First Alternate Example

The Magnetic Heat Exchange Unit 1113

Figure 13:
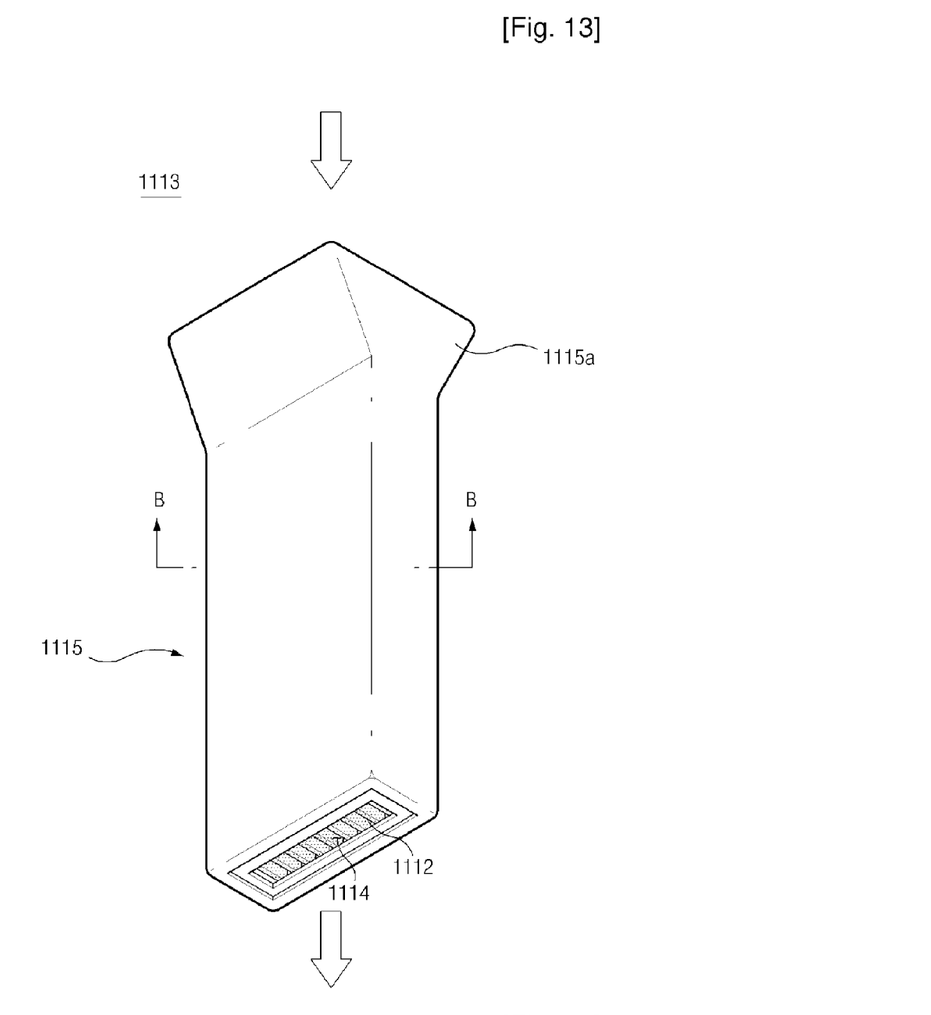
FIG. 13 is a perspective view illustrating a magnetic heat exchange unit in accordance with a first alternate example of the second preferred embodiment of the present invention.
Figure 14:
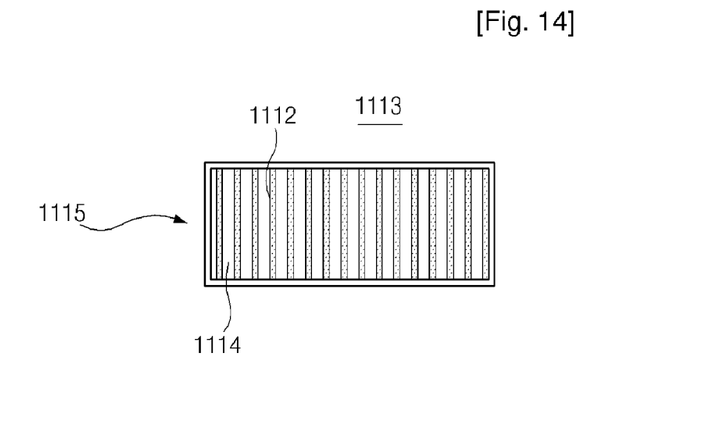
FIG. 14 is a cross-sectional view taken along a line B-B of FIG. 13.

As shown in FIGS. 13 and 14, the magnetic heat exchange unit 1113 in accordance with the first alternate example of the second embodiment comprises a case 1115 extending vertically, and a plurality of magnetocaloric material pieces 1112 disposed in the case 1115 to form a gap 1114.

An upper portion of the case 1115 has a shape of a funnel, a supporting piece 1115*b* supporting the plurality of magnetocaloric material pieces 1112 is disposed at a lower portion of the case 1115.

An upper case 1115*a* having the shape of the funnel carries out a function of guiding the heat transfer fluid into the case as well as a function of supporting itself by suspending from the mounting hole of the rotating plate 118.

In addition, as shown in FIGS. 11 and 12, it is preferable that the case 1115 is mounted in a manner that a portion of the case extends from the lower surface of the rotating plate 118.

The magnet 1140 may be disposed at both sides of the extending portion of the case 1115 to improve the heat exchange efficiency since the heat transfer fluid flows while the magnetic field is applied.

The plurality of magnetocaloric material pieces 1112, which have a shape of a plate manufactured from a gadolinium powder, are disposed in parallel in a manner that the gap 1114 prevents a contact with the case. The plurality of magnetocaloric material pieces 1112 having the shape of the plate may be a thin foil or a thick sheet according to a flow velocity and a heat exchange rate of the heat transfer fluid.

As described above, the plurality of plate type magnetocaloric material pieces 1112 having the gap 1114 prevents the loss of the material even when the mesh is not used, a contact with the entire plurality of magnetocaloric material pieces 1112 as well as a smooth flow is obtained since the heat transfer fluid flows through the gap 1114, and a higher heat exchange rate compared to that of the conventional art is obtained since a contact area is larger in case of the plate type.

Second Alternate Example

Magnetic Heat Exchange Unit 1213

Figure 15:
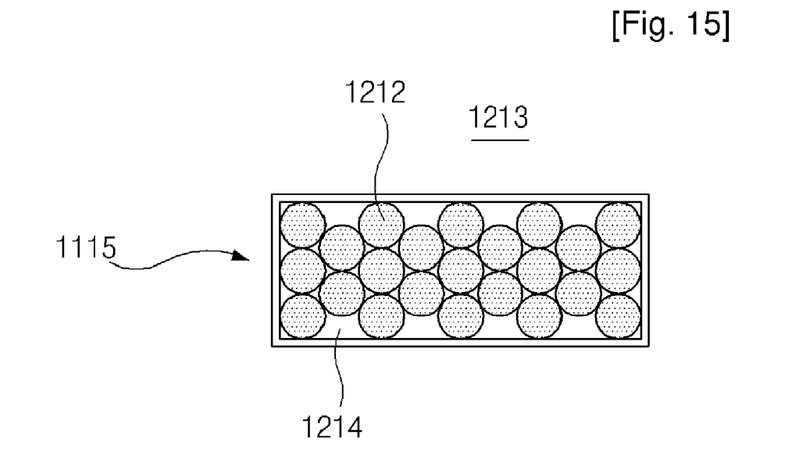
FIGS. 15 through 17 are cross-sectional views taken along a line B-B of FIG. 13 of a second alternate example

As shown in FIG. 15, the magnetic heat exchange unit 1113 in accordance with the second alternate example of the second embodiment comprises a plurality of magnetocaloric material pieces 1212 having a shape of a rod instead of the plurality of magnetocaloric material pieces 1112 having the shape of the plate. That is, each of the plurality of magnetocaloric material pieces 1212 has the shape of the rod having a constant circular cross-section in a lengthwise direction.

A gap 1214 between the plurality of magnetocaloric material pieces 1212 having the shape of the rod is formed when in contact or not in contact due to the circular cross-section even when the plurality of magnetocaloric material pieces 1212 are randomly arranged such that an effect of the first embodiment is obtained when the heat transfer fluid flows through the gap 1214.

It is preferable that the plurality of magnetocaloric material pieces 1212 having the shape of the rod are inserted in a batch arranged vertically.

Figure 18:
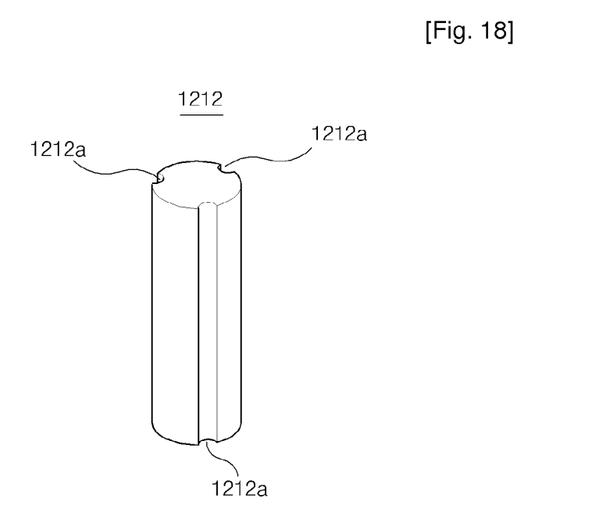
FIG. 18 is a perspective view illustrating a magnetocaloric piece having a shape of a rod.

On the other hand, as shown in FIG. 18, it is preferable that the plurality of magnetocaloric material pieces 1212 having the shape of the rod comprises a groove 1212*a* in a lengthwise direction to increase the contact area with the heat transfer fluid, thereby improving the heat exchange efficiency.

Third Alternate Example

Magnetic Heat Exchange Unit 1313

Figure 16:
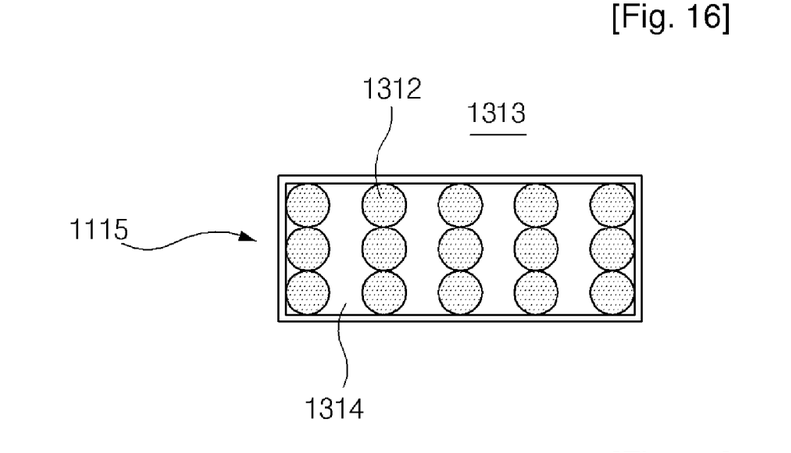

As shown in FIG. 16, the magnetic heat exchange unit 1213 in accordance with the third alternate example of the second embodiment comprises a plurality of magnetocaloric material pieces 1312 having the shape of the rod arranged in a manner similar to the plurality of magnetocaloric material pieces 1112 having the shape of the plate of the first alternate example instead of a random arrangement of the plurality of magnetocaloric material pieces 1212 having the shape of the rod of the second alternate example.

It is preferable that the plurality of magnetocaloric material pieces 1312 having the shape of the rod are inserted in a batch arranged vertically.

As shown in FIG. 18, it is preferable that the plurality of magnetocaloric material pieces 1312 having the shape of the rod comprises the groove 1212*a* in the lengthwise direction.

Fourth Alternate Example

Magnetic Heat Exchange Unit 1413

Figure 17:
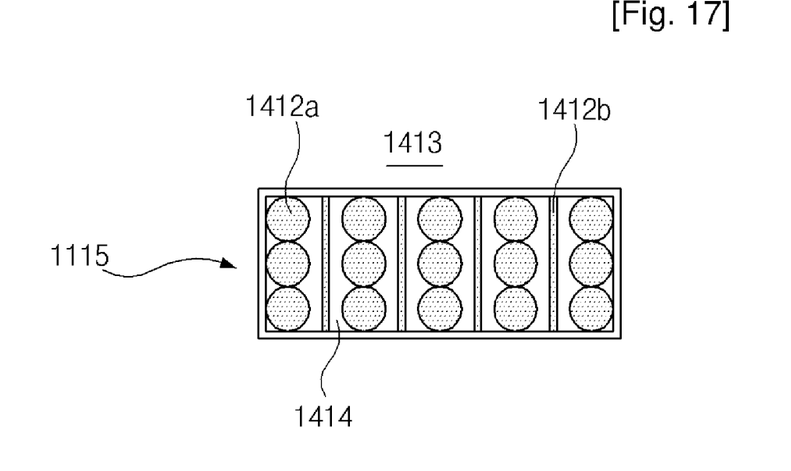

As shown in FIG. 17, the magnetic heat exchange unit 1413 comprises a plurality of magnetocaloric material pieces 1412*a* and a plurality of magnetocaloric material pieces 1412 having the shape of the plate are arranged to have a gap 1414 therebetween.

The rotating plate 118 is rotated by a motor 144 rotating a shaft 148 fixed to a center of the rotating plate 118. The magnetic heat exchange unit 1113, 1213, 1313 or 1413 spaced apart by the predetermined distance are disposed in the circumferential direction.

That is, the rotating plate 118 includes mounting holes punched along the circumference thereof, and the magnetic heat exchange unit 1113, 1213, 1313 or 1413 shown in FIGS. 14 through 17 are mounted in the mounting holes.

Third Embodiment

Figure 19:
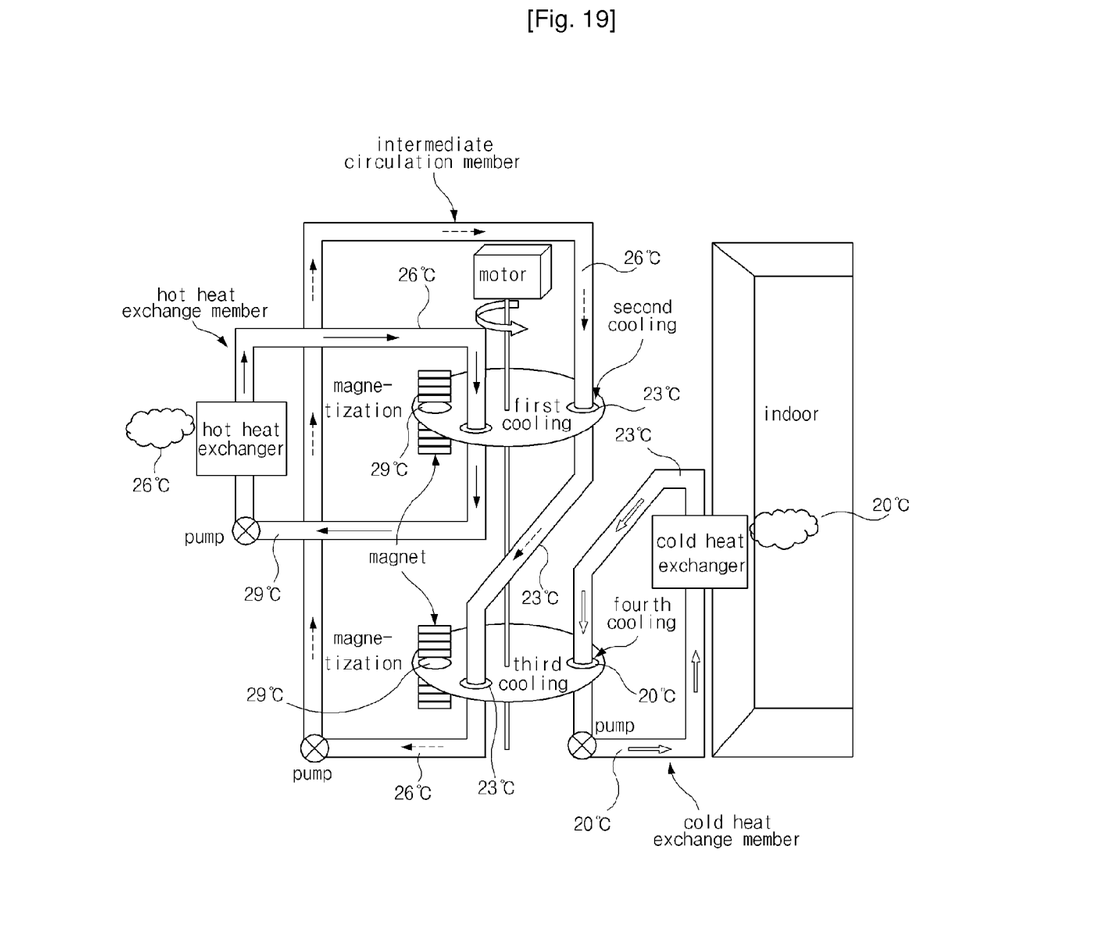
FIG. 19 is a front view illustrating a magnetic refrigerator in accordance with a third preferred embodiment of the present invention.

As shown in FIG. 19, a two-step cycle is embodied to increase a temperature range of the heat transfer fluid.

That is, a magnetic refrigerator of FIG. 19 comprises a first rotating plate and a second rotating plate having a motor, a magnet, a hot heat exchanger, a cold heat exchanger and a magnetic heat exchange unit containing a heat transfer fluid mounted thereon. The first rotating plate and the second rotating plate are rotated simultaneously by the motor, and, accordingly, a first magnetic heat exchange unit and a second magnetic heat exchange unit pass the magnet, a hot side and a cold side sequentially.

In accordance with the first rotating plate, the first magnetic heat exchange unit that passed a first magnet is heated by the magnetocaloric effect by the heat transfer fluid and the heat is cooled by a first heat transfer fluid passing the magnetocaloric material while the first heat transfer fluid is heated simultaneously.

The heated first heat transfer fluid emits the heat by passing through the hot heat exchanger and then is passed through the first magnetic heat exchange unit. The above-described cycle is repeated.

While the magnetocaloric material that has lost the heat to the first heat transfer fluid of the hot side (a first cooling) regains the lost heat by passing an intermediate cold side heat transfer fluid, a temperature of an intermediate heat transfer fluid drops to 23° C.

The intermediate heat transfer fluid cooled by a second cooling is magnetized by a second magnet of the second rotating plate and passes the magnetocaloric material heated to a temperature of 29° C. (a third cooling) to return to an original temperature thereof, and returns to the second cooling. The above-described cycle is repeated.

The magnetocaloric material is cooled to the intermediate heat transfer fluid having the temperature lower than those of the first cooling and the second cooling in the third cooling such that the temperature of the magnetocaloric material drops even more, and enters the cold heat exchanger at a temperature of 20° C. which is an optimized cooling temperature through a fourth cooling to lower the atmospheric temperature.

That is, when the atmospheric temperature is 26° C., the temperature of the magnetocaloric material heated to 29° C. by the first magnet of the first rotating plate (upper plate), the magnetocaloric material is cooled to 23° C. while the first heat transfer fluid $17ab$ is elevated to 29° C. when the magnetocaloric material is cooled by the first heat transfer fluid $17aa$ having the temperature of 26° C. in the first cooling to be passed through the hot heat exchanger to dissipate the heat and through the first magnetic heat exchange unit at the atmospheric temperature. The above-described cycle is repeated.

When the intermediate heat transfer fluid having the atmospheric temperature of 26° C. meets the magnetocaloric material of 23° C. to be cooled in the second cooling, the magnetocaloric material returns to the original temperature of the atmospheric temperature while the temperature of the intermediate heat transfer fluid drops to 23° C.

When the intermediate heat transfer fluid of 23° C. is magnetized by the second rotating plate (lower plate) to cool the heated magnetocaloric material (29° C.) in the third cooling, the intermediate heat transfer fluid returns to the original temperature of 26° C. to return to the second cooling. The above-described cycle is repeated.

The magnetocaloric material is cooled by the intermediate heat transfer fluid of 23° C. in the third cooling such that the temperature thereof drops to 23° C. The magnetocaloric material enters the cold heat exchanger at a cooling temperature of 20° C. through the fourth cooling to maintain the atmospheric temperature at 20° C.

A temperature variation of the intermediate heat transfer fluid is expanded due to a more cooling opportunity from two coolings to four coolings by an intermediate circulation member for guiding the intermediate heat transfer fluid circulating between a cold side of the plurality of first magnetocaloric exchange units and a hot side of the plurality of second magnetocaloric exchange units.

While the magnetic refrigerator of the present invention is not limited to the embodiments described above, it will be understood by those skilled in the art that various changes in form and details may be effected therein without departing from the spirit and scope of the invention. For instance, while the magnet 140 or 1140 is described to be a permanent magnet facing one another, it will be understood by those skilled in the art that the magnet 140 or 1140 may be embodied by en electromagnet.

As described above, the magnetic refrigerator in accordance with the present invention provides following advantages.

The circulation of the heat transfer fluid is divided to the hot heat exchanger and the cold heat exchanger to have two cycles and the magnetocaloric material is mounted on the circular rotating plate to be rotated between the hot heat exchanger and the cold heat exchanger for the heat exchange, thereby simplifying the structure of the magnetic refrigerating cycle.

In addition, in accordance with the system, since the heat transfer fluid at the atmospheric temperature is injected to the magnetocaloric material, the heat transfer fluid is heated and cooled more according to a state of the material to improve an efficiency of the heat exchanger.

Moreover, since the magnetic refrigerator is divided into the hot heat exchanger and the cold heat exchanger 163, amounts of the first heat transfer fluid and the second heat transfer fluid $17bb$ are controlled to be different. Therefore, a larger amount of the first heat transfer fluid may be flown to the hot side of the magnetic heat exchange unit to maximize the cooling of the magnetocaloric material.

In addition, the magnetocaloric material is sealed in the case to be in indirect contact with the heat transfer fluid so that the loss by the flowing the heat transfer fluid is prevented as well as preventing the oxidation for a semi-permanent use.

Moreover, the groove is formed at the sidewall of the case to increase the contact area with the flowing the heat transfer fluid, thereby improving the heat exchange efficiency.

In addition, the groove is slanted to increase the contact length, thereby improving the heat exchange efficiency even more.

Since the case comprises the aluminum, the superior heat transfer characteristic and the processing characteristic are provided.

The magnetic heat exchange unit is constructed to comprise the case extending vertically and the plurality of magnetocaloric material pieces disposed in the case to form the gap so that the heat transfer fluid may be flown through the gap, thereby improving the heat exchange efficiency through a uniform contact between the plurality of magnetocaloric material pieces and the heat transfer fluid and eliminating a need for the mesh for the smooth flow of the heat transfer fluid.

In addition, the heat exchange efficiency is improved by increasing the contact area with the heat transfer fluid when the groove is formed on the plurality of magnetocaloric material pieces having the shape of the rod in the lengthwise direction.

Moreover, the plurality of magnetocaloric material pieces have the shape of the plate or the rod such that the plurality of magnetocaloric material pieces are not lost.

In addition, the two-step cycle is embodied to increase a temperature range of the heat transfer fluid due to the more cooling opportunity from two coolings to four coolings, thereby increasing an application range of a filed of a magnetic refrigerating or the magnetic heat exchange refrigerator.

LIST OF REFERENCE SYMBOLS 60, 160, 161: pump
62, 162: hot heat exchanger
63, 163: cold heat exchanger
13: magnetic heat exchange unit
17aa, 17ab: first heat transfer fluid
17bb, 17bc: second heat transfer fluid
112, 212, 1312, 412a, 412b: magnetocaloric material piece (Gd)
113, 213, 1113, 1213, 1313, 1413: magnetic heat exchange unit
113a: a hot side of magnetic heat exchange unit
113b: a cold side of magnetic heat exchange unit
115: mounting case
116, 117: mesh
130, 131, 132, 133: pipe
140, 1140: magnet
144: motor
148: shaft
215: case
217, 219: groove
221: through-hole
1114, 1214, 1314, 1414: gap
1115: case
1115a: funnel portion
1115b: supporting piece

What is claimed is:

1. A magnetic refrigerator, comprising:
a plurality of magnetic heat exchange units configured to exchange heat with a flow of a heat transfer fluid, each unit including a case including an upper case and lower case and a magnetocaloric material sealed in the case to prevent direct contact between the magnetocaloric material and the heat transfer fluid, a temperature of the magnetocaloric material changing when a magnetic field is applied;
a rotating plate comprising a plurality of mounting holes disposed along a circumference of the rotating plate, the plurality of magnetic heat exchange units being mounted in the mounting holes and having a predetermined distance therebetween;
a magnet disposed along portions of an upper surface and a bottom surface of the rotating plate, the magnet applying a magnetic field to increase the temperature of the magnetic heat exchange units in the magnetic field;
a hot heat exchange member disposed at a hot side of the plurality of magnetic heat exchange units; and
a cold heat exchange member disposed at a cold side of the plurality of magnetic heat exchange units,
wherein the heat transfer fluid is divided into a first heat transfer fluid circulating in the hot heat exchange member and a second heat transfer fluid circulating in the cold heat exchange member.

2. The refrigerator in accordance with claim 1, wherein the hot heat exchange member comprises a hot heat exchanger, a first pipe for moving the first heat transfer fluid at a cold side outlet of the hot heat exchanger to the hot side of the plurality of magnetic heat exchange units, and a second pipe for moving the first heat transfer fluid to a hot side inlet of the hot heat exchanger, wherein the first heat transfer fluid absorbs a heat of the magnetocaloric material, and
the cold heat exchange member comprises a cold heat exchanger, a third pipe for moving the second heat transfer fluid at a hot side outlet of the cold heat exchanger to the cold side of the plurality of magnetic heat exchange units, and a fourth pipe for moving the second heat transfer fluid to a cold side inlet of the cold heat exchanger, wherein the second heat transfer fluid emits a heat to the magnetocaloric material.

3. The refrigerator in accordance with claim 1, wherein the magnetocaloric material comprises gadolinium.

4. The refrigerator in accordance with claim 1, wherein the case comprises a groove at a sidewall thereof.

5. The refrigerator in accordance with claim 4, wherein the groove is slanted from an upper portion of the uppercase toward a lower portion of the lower case.

6. The refrigerator in accordance with claim 1, wherein the case comprises aluminum.

7. The refrigerator in accordance with claim 6, wherein the upper case and the lower case are sealed by a copper brazing.

8. The refrigerator in accordance with claim 7, wherein the case further comprises a through-hole for passing the heat transfer fluid therethrough.

9. The refrigerator in accordance with claim 1, wherein the magnetocaloric material comprises gadolinium.

10. A magnetic refrigerator, comprising:
a plurality of magnetic heat exchange units, each magnetic heat exchange unit comprising a case and a plurality of magnetocaloric material pieces for exchanging heat with a flow of a heat transfer fluid, wherein the magnetocaloric material pieces are spaced apart in the case such that each of the plurality of magnetocaloric material pieces and the case have a predetermined distance therebetween;
a rotating plate, the plurality of magnetic heat exchange units being disposed along a circumference of the rotating plate and spaced apart at a predetermined distance, each of the magnetic heat exchange units being mounted in a manner that its case passes through the rotating plate in a vertical direction and a portion of its case extends from a lower surface the rotating plate;
a magnet disposed below a bottom surface of the rotating plate and on opposite sides of the extending portion of the case of one of the magnetic heat exchange units, the magnet applying a magnetic field to increase a temperature of the magnetic heat exchange units when the plurality of magnetic heat exchange units pass;
a hot heat exchange member disposed at a hot side of the plurality of magnetic heat exchange units; and
a cold heat exchange member disposed at a cold side of the plurality of magnetic heat exchange units,
wherein the heat transfer fluid is divided into a first heat transfer fluid circulating in the hot heat exchange member and a second heat transfer fluid circulating in the cold heat exchange member.

11. The refrigerator in accordance with claim 10, wherein an upper portion of the case has a shape of a funnel, and a supporting piece for supporting each of the plurality of magnetocaloric material pieces is disposed at a lower portion of the case.

12. The refrigerator in accordance with claim 11, wherein the plurality of magnetocaloric material pieces are disposed in a manner that the plurality of magnetocaloric material pieces are not in contact with one another.

13. The refrigerator in accordance with claim 11, wherein each of the plurality of magnetocaloric material pieces has a shape of a rod having a constant circular cross-section in a lengthwise direction.

14. The refrigerator in accordance with claim 10, wherein the magnetocaloric material comprises gadolinium.

15. A magnetic refrigerator comprising:

a first rotating plate in which is mounted a plurality of first magnetic heat exchange units configured to exchange heat with a flow of a first heat transfer fluid, disposed along a circumference thereof, each of the plurality of first magnetic heat exchange units including a case including an upper case and lower case and a first magnetocaloric material sealed in the case to prevent direct contact between the first magnetocaloric material and the first heat transfer fluid, a temperature of the first magnetocaloric material changing when a magnetic field is applied;

a first magnet disposed along portions of an upper surface and a bottom surface of the first rotating plate, the first magnet applying a magnetic field to increase a temperature of the first magnetocaloric material of the first magnetic heat exchange units in the magnetic field;

a hot heat exchange member disposed at a hot side of the plurality of first magnetic heat exchange units and configured to circulate the first heat transfer fluid;

a second rotating plate in which is mounted a plurality of second magnetic heat exchange units configured to exchange heat with a flow of a second heat transfer fluid, disposed along a circumference thereof, each of the plurality of second magnetic heat exchange units including a second magnetocaloric material, a temperature of the second magnetocaloric material changing when a magnetic field is applied;

a second magnet configured to apply a magnetic field to increase a temperature of the second magnetocaloric material of the second magnetic heat exchange units in the magnetic field;

a cold heat exchange member disposed at a cold side of the plurality of first second magnetic heat exchange units and configured to circulate the second heat transfer fluid; and an intermediate circulation member for guiding an intermediate heat transfer fluid circulating between the cold side of the plurality of first magnetic heat exchange units and a hot side of the plurality of second magnetic heat exchange units.

16. The refrigerator in accordance with claim 10, wherein the hot heat exchange member comprises a hot heat exchanger, a first pipe for moving the first heat transfer fluid at a cold side outlet of the hot heat exchanger to the hot side of the plurality of magnetic heat exchange units, and a second pipe for moving the first heat transfer fluid to a hot side inlet of the hot heat exchanger, wherein the first heat transfer fluid absorbs a heat of the magnetocaloric material, and the cold heat exchange member comprises a cold heat exchanger, a third pipe for moving the second heat transfer fluid at a hot side outlet of the cold heat exchanger to the cold side of the plurality of magnetic heat exchange units, and a fourth pipe for moving the second heat transfer fluid to a cold side inlet of the cold heat exchanger, wherein the second heat transfer fluid emits heat to the magnetocaloric material.

17. The refrigerator in accordance with claim 15, wherein the hot heat exchange member comprises a hot heat exchanger, a first pipe for moving the first heat transfer fluid at a cold side outlet of the hot heat exchanger to the hot side of the plurality of first magnetic heat exchange units, and a second pipe for moving the first heat transfer fluid to a hot side inlet of the hot heat exchanger, wherein the first heat transfer fluid absorbs a heat of the first magnetocaloric material, and the cold heat exchange member comprises a cold heat exchanger, a third pipe for moving the second heat transfer fluid at a hot side outlet of the cold heat exchanger to the cold side of the plurality of second magnetic heat exchange units, and a fourth pipe for moving the second heat transfer fluid to a cold side inlet of the cold heat exchanger, wherein the second heat transfer fluid emits heat to the second magnetocaloric material.

* * * * *